(12) United States Patent
Hwang

(10) Patent No.: US 6,252,907 B1
(45) Date of Patent: Jun. 26, 2001

(54) DEMULTIPLEXER AND TRANSPORT DECORDER EMPLOYING THE SAME

(75) Inventor: Sung Bae Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 08/998,076

(22) Filed: Dec. 24, 1997

(30) Foreign Application Priority Data

Dec. 27, 1996 (KR) .................................................. 96/73516

(51) Int. Cl.[7] ...................................................... H04N 7/18
(52) U.S. Cl. ................................. 375/240.25; 375/240.26
(58) Field of Search ................................... 348/387, 423, 348/462, 465, 845, 845.1, 845.2, 845.3, 10; 370/465, 477, 516; 386/68, 81, 88; 375/240.25, 240.26

(56) References Cited

U.S. PATENT DOCUMENTS 5,742,361 * 4/1998 Nakase et al. ....................... 348/845
5,966,385 * 10/1999 Fujii et al. ........................... 348/423
6,021,440 * 2/2000 Post et al. ........................... 348/423
6,031,960 * 2/2000 Lane .................................... 348/423

* cited by examiner

*Primary Examiner*—Andy Rao

(57) ABSTRACT

The transport decoder is disclosed including: a demultiplexer for demultiplexing an input transport stream, to output PID streams desired by a user in the form of transport stream, and outputting the transport stream other than the PID stream according to an output control signal selected by the user; a storage for storing the transport stream output from the demultiplexer; second, third and fourth decoders for decoding video data, audio data and additional data according to a select control signal selected by the suer, respectively; a first decoder for decoding the transport stream, to decode the stream other than the currently being decoded video data stream, audio data stream and additional data stream according to a selection of the user, and to transmit it; and control means for providing the output control signal.

19 Claims, 8 Drawing Sheets

DEMULTIPLEXER AND TRANSPORT DECORDER EMPLOYING THE SAME

BACKGROUND OF THE INVENTION

1. Field of the Invention

The present invention relates to a demultiplexer and transport decoder employing the demultiplexer.

2. Discussion of Related Art

There have been proposed a lot of methods for transmission/reception format for digital processed picture and audio data between media. One of them is MPEG 2 system part proposed by MPEG 2, which makes picture-compressed and audio-compressed data in a format which can be easily used, to transmit and receive the data between media. In the transmission and reception of video data and audio data, the video data and audio data are encoded, compressed, and multiplexed by MPEG transport encoder, to be transmitted. The multiplexed stream is received, and demultiplexed by MPEG transport decoder, and the video data and audio data are decoded by MPEG video decoder and audio decoder respectively, to be supplied to a user.

FIG. 1A is a block diagram of a conventional MPEG decoder. The configuration and operation of the conventional MPEG decoder is explained with reference to FIG. 1A. The MPEG encoder includes; first and second encoders 10 and 11 for encoding input video data and audio data, to output video bit stream and audio bit stream, respectively, first and second packetizers 12 and 13 for packetizing the video bit stream and audio bit stream sent from first and second encoders 10 and 11; and a multiplexer 14 for multiplexing the packetized bit streams, to make one bit stream, and store or transmit it.

When video data is received, first encoder 10 compresses/codes the video data, to convert is into MPEG video bit stream. When audio data is received, second encoder 11 compresses/codes the audio data, to convert it into MPEG audio bit stream. The MPEG video bit stream converted by first encoder 10 is sent to first packetizer 12, to be packetized in a proper length and output to multiplexer 14. The audio bit stream compressed by second encoder 11 is sent to second packetizer 13, to be packetized in a proper length and output to multiplexer 14.

The video and audio streams are multiplexed by multiplexer, 14, to be converted into one bit stream, and stored or transmitted through a channel. Multiplexer 14, the transport multiplexer, not only receives MPEG video bit stream and audio bit stream but multiplexed compressed/coded video stored or transmitted through a channel. Multiplexer 14, the transport multiplexer, not only receives MPEG video bit stream and audio bit stream but multiplexes compressed/coded video stream and audio stream other than the MPEG video and audio bit streams, to store them as one bit stream and transmit it through a channel. To decode a program consisting of video data and audio data and provide a user with it, a desired bit stream must be selected. For this, it is required that a specific identification (ID) is given to each bit stream, and information on the ID is additionally provided. Accordingly, the additional data is sent to the transport stream by multiplexer 14, to be stored or transmitted. The configuration of the transport bit stream is shown in FIG. 1B. In FIG. 1B, reference numeral H represents headers of the transport bit stream, $P_1A$ and $P_2A$ represent audio signal sections, $P_1V$ and $P_2V$ represent video signal sections, and hatched portion represents headers of packetized element stream (PEG).

FIG. 2A illustrates a conventional typical MPEG transport decoder. The streams stored in multiplexer 14 shown in FIG. 1A or transmitted through a channel, that is, the streams transmitted through the airwaves, or stored is a CD-ROM and then reproduced, are applied to a first decoder 20 shown in FIG. 2A. First decoder 20 tunes and demodulates a signal input and audio stream, and outputs them to second and third decoders 23 and 24, respectively.

Second decoder 23 decodes the video stream, to reproduce a video signal according to an output timing signal supplied from a clock controller 22. Third decoder 24 decodes the audio stream, to reproduce an audio signal according to the output timing control signal applied from clock controller 22. The video and audio signals output from second and third decoders 23 and 24 are MPEG signals which do not include the above-described headers as shown in FIG. 2C. These signals are not used for recording but used for displaying. In other words, demultiplexer 21 outputs the audio data and video data having no headers, decodes and displays them. Thus, when the data having no header is stored in a recording medium, it is impossible to reproduce the data from the medium.

That is, data is output from demultiplexer 21 in the form of packet, and multiple packets are divided into audio packet and video packet depending on their header information. Accordingly, because the conventional transport decoders output only audio data and video data which do not include header information, when the data is recorded in a recording medium, and then reproduced, it is impossible to confirm if the reproduced data is the audio packet or video packet. Thus, correct decoding cannot be performed. To enable the transport decoder to output both audio and video data for display as shown in FIG. 2C and audio video data including headers for recording as shown in FIG. 2B, it requires two transport decoders 31 and 32 shown in FIG. 2D.

First transport decoder 31 outputs the data for displaying, and second transport decoder 32 outputs the data including headers for recording. The data for displaying is displayed through a display 33, and data for recording is recorded in a recording medium 34. Here, clock controller 22 controls timing between second decoder 23, third decoder 24, demultiplexer 21, to adjust lip sync or decoding rate between video data and audio data. Due to the broad and complicated transport stream of the conventional transport decoder, there are developing lots of program type transport demultiplexers. However, these demultiplexers can be variously applied according to programs, but their operation speed is deteriorated. Furthermore, the demultiplexers require additional cores other than necessary logics, increasing their sizes.

SUMMARY OF THE INVENTION

Accordingly, the present invention is directed to a demultiplexer and transport employing the same that substantially obviates one or more of the problems due to limitations and disadvantages or the related art.

An object of the present invention is to provide a transport demultiplexer which outputs recording data including headers, and simultaneously, outputs displaying data including no deader.

Another object of the present invention is to provide a hard-wired transport demultiplexer having smaller size and faster speed.

Still another object of the present invention is to provide a transport decoder which employing the aforementioned transport demultiplexer.

Additional features and advantages of the invention will be set forth in the description which follows, and in part will be apparent from the description, or maybe learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the demultiplexer, includes: a buffer for temporarily storing and outputting a transport stream, the transport stream consisting of header portion and payload portion, the header portion including a transport header and PES/PSI header; a controller for receiving the transport stream output from the buffer, and being operated according a mode signal applied thereto, to output the header portion and payload portion of the transport stream without any changes, a PES/PSI decoder for receiving the transport stream output from the buffer, and being operated according to the mode signal applied thereto, to decode only PES/PSI header and output only payload portion; and a transport header decoder for detecting the transport header from the transport stream sent from the buffer, and supplying the mode signal to the controller and PES/PSI decoder according to the content of the detected header, the mode signal being one of a signal for operating only PES/PSI decoder, a signal for operating only controller, and a signal for operating both the PES/PSI decoder and controller.

The transport decoder according to the invention includes; a demultiplexer for demultiplexing an input transport stream, to output PID streams desired by a user in the form of transport stream, and outputting the transport stream other than the PID streams according to an output control signal selected by the user, a storage for storing the transport stream output from the demultiplexer; second, third and fourth decoders for decoding video data, audio data and additional data according to a select control signal selected by the user, respectively; a first decoder for decoding the transport stream, to decode the stream other than the currently being decoded video data stream, audio data stream and additional data stream according to a selection of the user, and to transmit it; and control means for providing the output control signal.

The demultiplexer is constructed is hard-wired. The demultiplexer uses an external storage, for example, DRAM, to reduce the capacitor of the buffers included therein. Furthermore, the demultiplexer combines the memories added to the docoders for audio data and additional data into one external storage.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 1A is a block diagram illustrating a conventional MPEG-2 encoder;

FIG. 1B a diagram illustrating a configuration of a transport stream;

DETAILED DESCRIPTION OF PREFERRED EMBODIMENT

Reference will now be made in detail to the preferred embodiments of the present invention, examples of which are illustrated in the accompanying drawings.

Figure 1A:
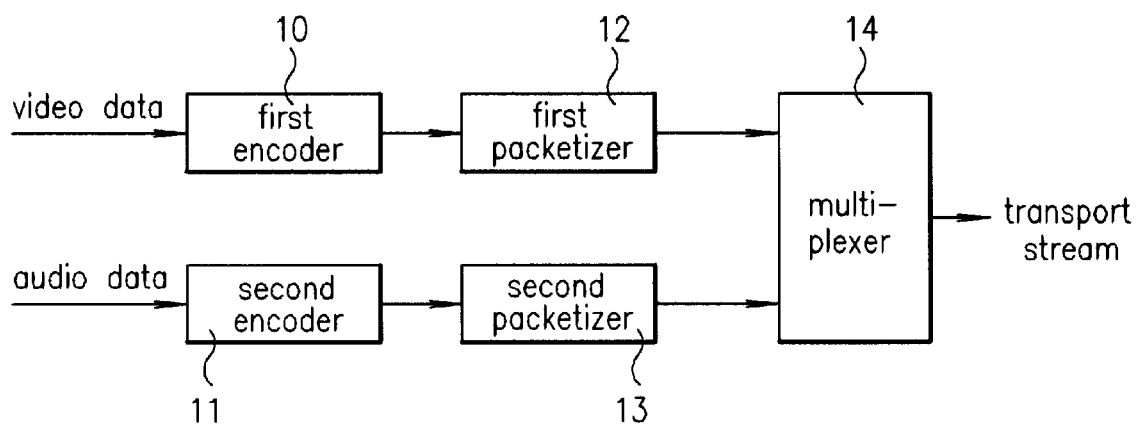
Figure 1B:
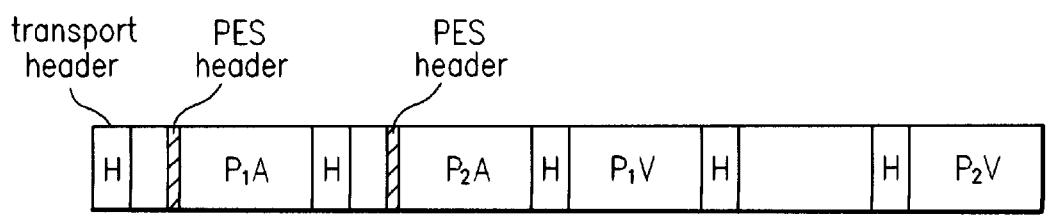
Figure 3A:
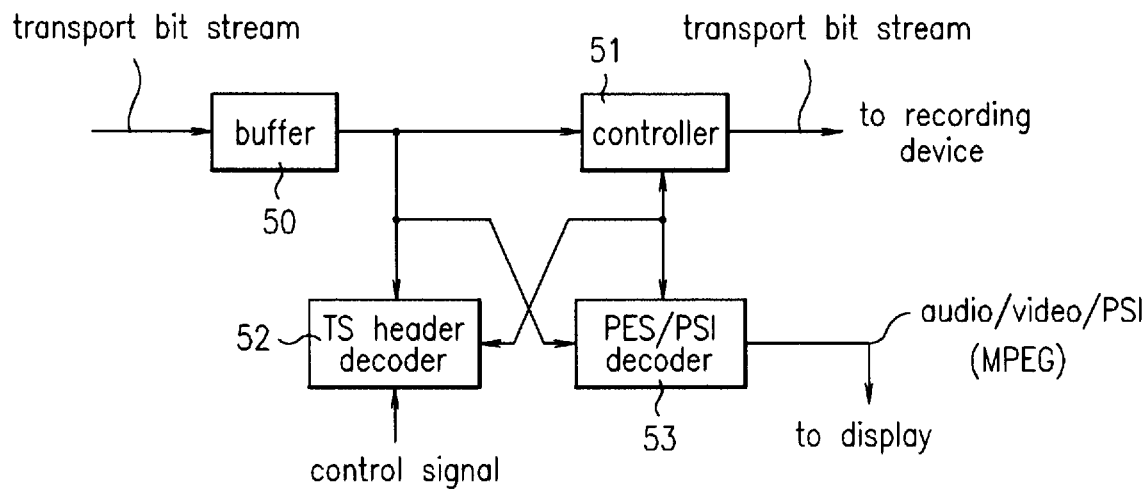
FIG. 3A is a conceptional diagram of a demultiplexer according to the present invention.

FIG. 3A illustrates a transport demultiplexer according to the present invention. Referring to FIG. 3A, transport stream externally input is temporarily stored in a butter 50, and than output therefrom without any change. This transport stream is constructed in 188 bytes. The transport stream which passed through buffer 50 is shown in FIG. 1B. A transport header decoder 52 detects a transport header from the transport stream, to determine the type of each packet data of the transport stream. For example, when the detected header is desired data 1 of FIG. 1A, data P1 is output through a controller 51 of PES/PSI (packetized elementary stream/ program specific information decoder 53 according to the detected header.

Figure 2A:
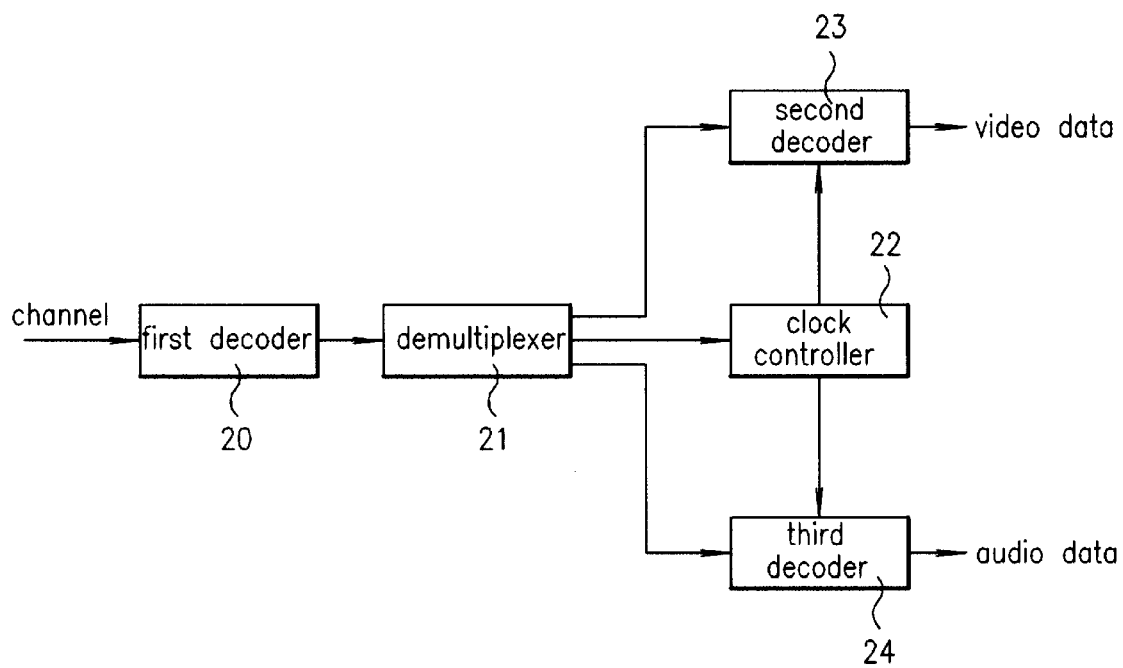
FIG. 2A is a block diagram illustrating a conventional transport decoder.
Figure 2B:
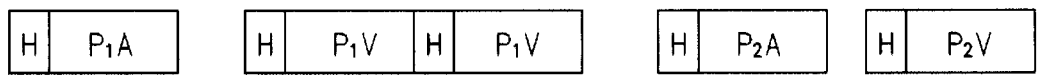
FIG. 2B is a diagram illustrating a configuration of a data stream for recording.
Figure 2C:
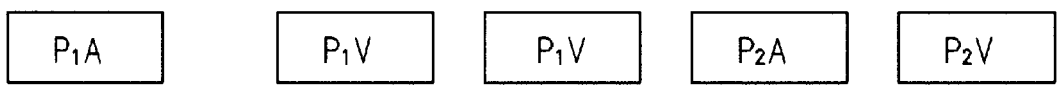
FIG. 2C is a diagram illustrating a configuration of data stream for displaying.
Figure 2D:
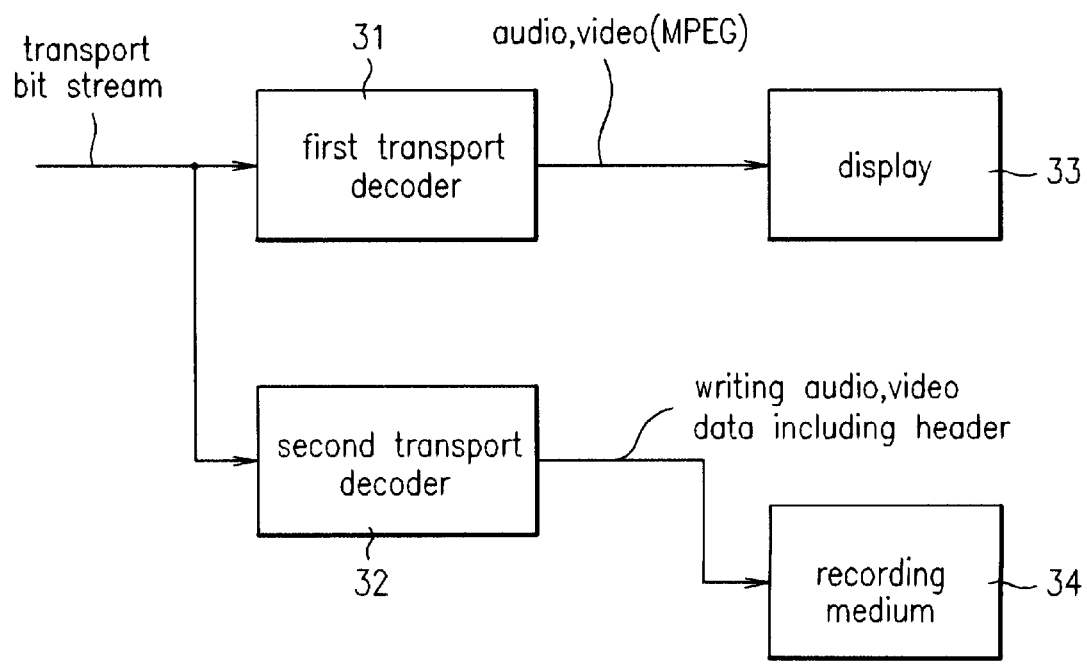
FIG. 2D is a diagram for explaining a convention method of outputting displaying data stream and recording data stream together.

Controller 51 outputs the transport stream in packet unit without any changes. That is, a desired packet is input, controller 51 externally outputs data of the packet to a recording device. The output signal of controller 51 in shown in FIG. 2B, which includes headers. Accordingly, this signal can be recorded in a recording device, or recorded and then reproduced. PES/PSI decoder 53 decodes the payload of the transport stream. The payload represents data other than the headers of the transport stream. PES/PSI decoder 53 outputs the audio data and video data of FIG. 2C to external audio video decoders. PSI data is checked if it is desired, and then output to a memory or microcomputer.

The configuration and operation of the transport demultiplexer of the invention is explained below in detail. To perform the above-described operation, it requires that three cases to be described below are available. The first case in that PES/PSI decoding is carried out. When the transport header is detected by transport header decoder 52, and it is judged that packet data, which is input according to the detected header, decoded only PES/PSI header, transport header decoder 52 gives the control authority to PES/PSI decoder 51. Transport header decoder 52 operates according to a control signal externally applied. PES/PSI decoder 53 reads packet data from buffer 50, decodes the PES/PSI header when it is included in the packet data, divides the payload into audio data, video data and PSI data and outputs them.

Figure 3B:
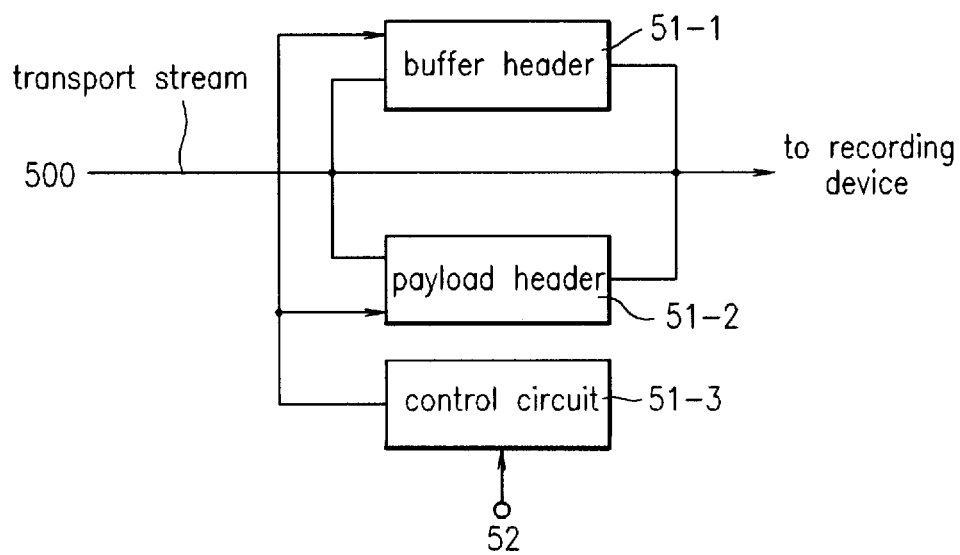
FIG. 3B is a block diagram of the controller of FIG. 3A.

The second case is that only controller 51 operates. As shown in FIG. 3B, controller 51 includes a header buffer 51-1 for temporarily storing the headers, a payload buffer 51-2 for storing data other than the headers, and a control circuit 51-3 for controlling the operation of header buffer 51-1 and payload buffer 51-2 according to the headers output from transport header decoder 52. When transport header decoder 52 detects the transport header from the transport stream, and it is judges that the detected header operates only controller 51, transport header decoder 52 gives the control authority to controller 51. In this case, since the transport header must be also transmitted, payload buffer 51-2 stores data other than the headers and header buffer 51-1 stores the headers which transport header decoder 52 roads the transport header from the transport stream output from buffer 50. Given control authority by transport header decoder 52, controller 51 outputs the stored header from header buffer 51-1 first, and then reads and outputs data from payload buffer 51-2. Header buffer 51-1 must have the size lager than four bytes because the transport header has at least four bytes in size.

The third case is that PES/PSI decoder 53 and controller 51 operates simultaneously. Through the aforementioned procedure, transport header decoder 52 gives the control authority to PES/PSI decoder 52, and simultaneously, applies a signal to controller 51 to operate it, PES/PSI decoder 53 reads the transport stream from buffer 50 as the first case, and outputs audio data, video data and PSI data which include no header. Controller 51 outputs the 4 byte header stored in header buffer 51-1 first, similar to the second case, and then outputs audio data, video data and PSI data stored in payload buffer 51-2. That is, payload buffer 51-2 stores the payload data read by PES/PSI decoder 53, and outputs it under control of control circuit 51-3 when header buffer 51-1 outputs headers. Controller 51 and PES/PSI decoder 53 operate independently so that controller 51 includes payload buffer 51-2 therein to store the payload data road by PES/PSI decoder 53. As described above, header buffer 51-1 storing the transport header and payload buffer 51-2 storing the payload data are separately included in controller 51, and control circuit 51-3 controls the input/output of each buffer in response to a signal from transport header decoder 52. Data output from controller 51 is transmitted to a recording device through a faar port.

The transport decoder of the present invention outputs the recording data including header as well as the displaying data including no header when data in output by the demultiplexer before MPEG signal is decoder. The header includes information representing if the following payload data is audio packet or video packet so that the data output from controller 51 can be recorded in the recording medium by the recording device for reproduction. Accordingly, with the demultiplexer of the invention. P1 of FIG. 1B can be recorded while it is seen, P2 can be recorded while P1 is seen, and P1 can be also recorded while P2 is seen.

Figure 3C:
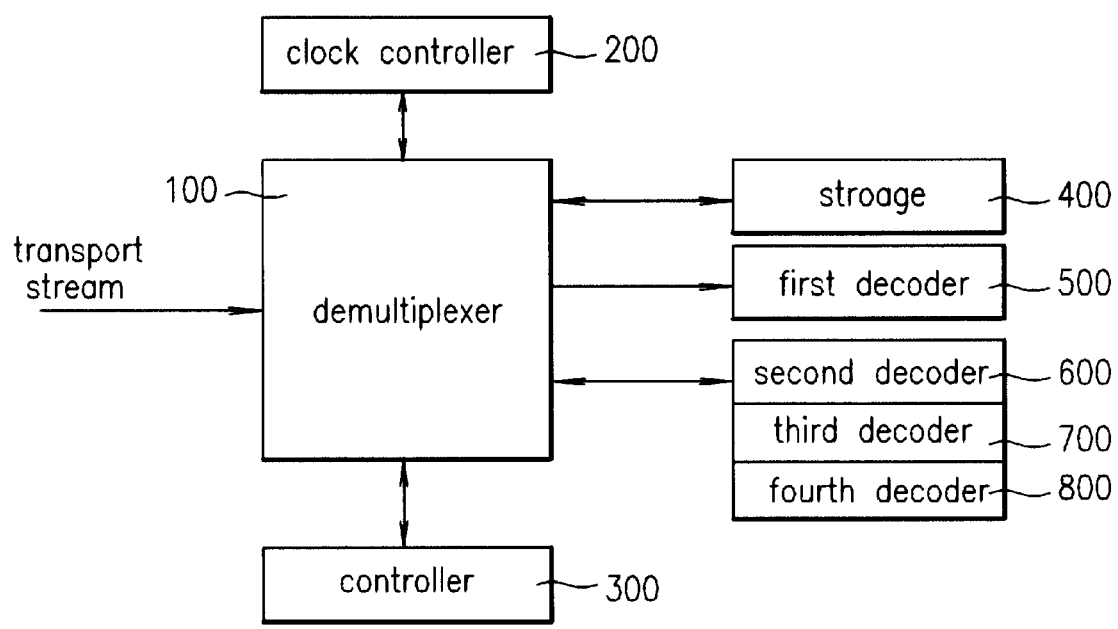
FIG. 3C is a block diagram of a transport decoder according to the present invention.
Figure 4:
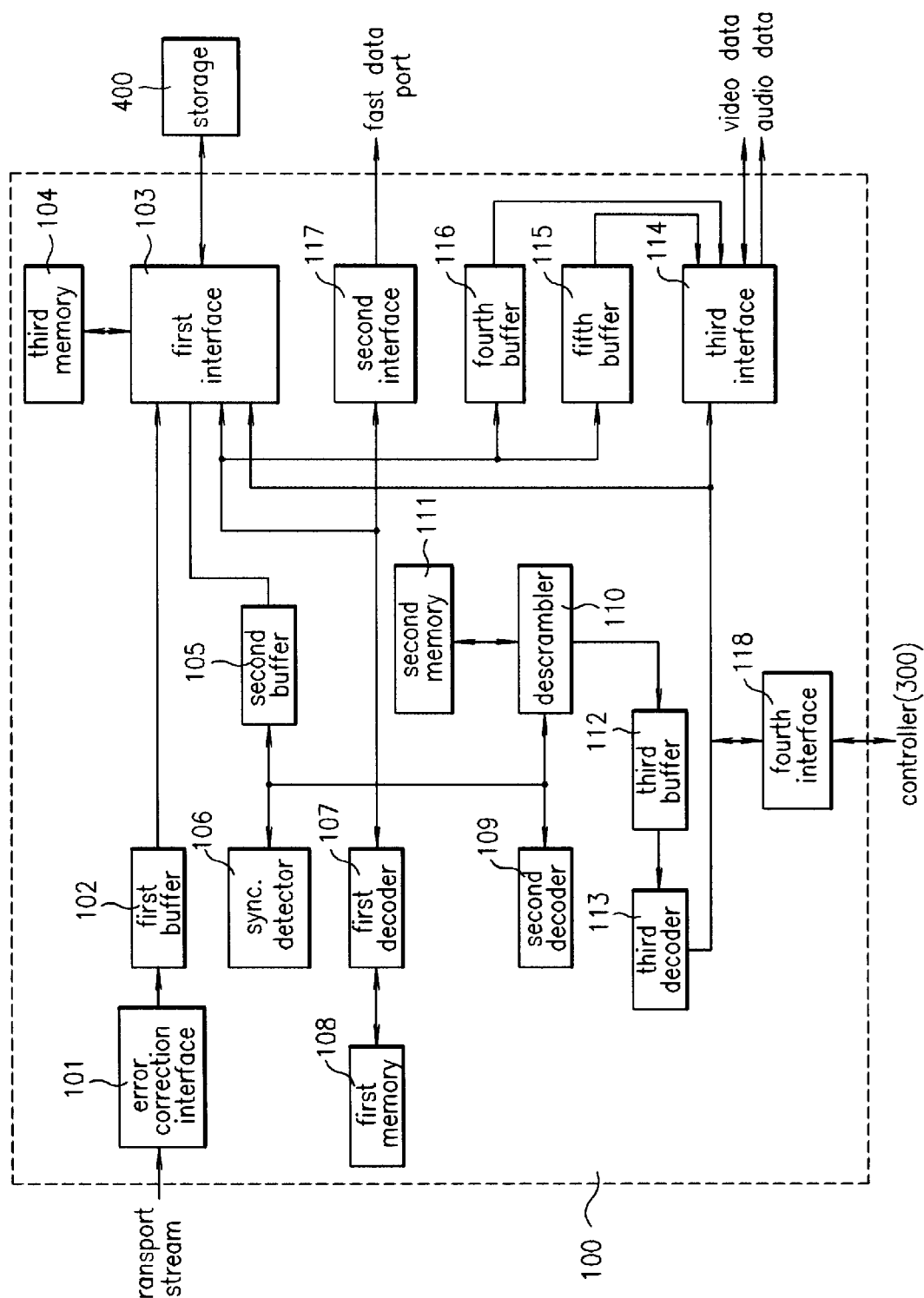
FIG. 4 is a diagram illustrating a detailed configuration of the demultiplexer of FIG. 3C.

FIG. 3C is a block diagram of the transport decoder of the invention, and FIG. 4 is a detailed block diagram of the demultiplexer of FIG. 3C. Referring to FIG. 3C, the transport decoder includes, a demultiplexer 100 for demultiplexing an input transport stream, a storage 400 for storing the transport stream output from demultiplexer 100; second, third and fourth decoders 600, 700 and 800 for decoding video data, audio data and additional data of the transport stream, which are selected according to a select control signal of a controller 300 by a user; and a first decoder 600 or decoding the transport stream and transmitting portions of the stream other than currently being decoded video data, audio data and additional data in the form of transport stream according to the user's selection.

Controller 100 acts various parameters required to operate demultiplexer 100, a transport demultiplexer, and checks its inner state. Demultiplexer 100 includes a fast data port for supplying a signal for timing controlling clock controller 200 and outputting a stream of packet data desired by the user in the form of transport stream. This transport stream is provided for first decoder 500. First decoder 500 is used for the following operation. For example, it is assumed that a broadcasting program, constructed of video data, audio data and additional data which are currently being sent from second, third and fourth decoders 600, 700 and 800 and watched by the user, is a program of KBS (Korean Broadcasting System). When the user wants to record a program of another broadcasting system using a VCR, first decoder 500 selectively decoders the streams of the program and supplies them to the VCW. Storage 400 configured of DRAM is used as a buffer for the video data, audio data and additional data. Thus, it reduces the capacity of memories included in demultiplexer 100.

Demultiplexer 100 of FIG. 3C can have the configuration shown in FIG. 4. Referring to FIG. 4, demultiplexer 100 includes: an error correction interface 101 for receiving a transport stream sent from an external error corrector (not shown); a first buffer 102 for temporarily storing the transport stream; a first interface 103 for interfacing the buffered stream and storing it in storage 400, a second buffer 105 for storing the transport stream stored in storage 400 through first interface 103 according to the decoding signal of controller 300, a sync detector 106 for detecting synchronization for the stream output from second buffer 105; a first decoder 107 for decoding the headers of the stream output from second buffer 105 and detecting a desired packet according in the decoding result, a second decoder 109 for detecting and decoding adaptation field of the stream output from second buffer 105, a descrambler for descrambling video data, audio data and additional data; a third buffer 112 for storing the descrambled data; a third decoder 113 for decoding the descrambled data stored in third buffer 112; a third interface 114 for storing the decoded audio data and additional data in storage 400 through first interface 103, and interfacing the video bit stream to second decoder 600 of video decoder; fourth and fifth buffers 115 and 116 for reading the audio data and additional data stored in storage 400, temporarily storing them, and outputting them to third and fourth decoders 700 and 800 shown in FIG. 3C, which are audio and additional decoders, through third interface 114, a third memory 104 for, when data is written or read to or from storage 400 through first interface 103, storing start, end, read and write pointers corresponding to the data buffer of the storage, a first memory 108 for storing PID and type of a packet to be decoded by first decoder 107; a second interface 117 for externally outputting the transport stream without any change; a second memory 111 for storing a clock for the descrambling; and a fourth interface 118 for interfacing control signals for each section, which are supplied from controller 300.

Error correction interface 101 stores the input transport stream in first buffer 102. This buffered transport stream is stored in storage 400 through first interface 103. Storage 400 is configured of DRAM. The stream is read against according to the decoding signal of controller 300 and stored in second buffer 105. Accordingly, even if the amount of data of the input transport stream is lager, overflow can be prevented by storage 400, and first and second buffers 102 and 105 can be made in smaller size.

Sync detector 106 detects the sync bite (0x47) of the data stored in second buffer 105. When it detects a reliable sync byte, for example, when the sync byte placed at every 188-byte transport packet is detected a predetermined number of times the user wants, first decoder 107 decodes the headers of the transport stream stored in second buffer 106 and sync checking is continuously performed. First decoder 109 decodes the transport stream header to detect a desired packet, and stores data other than video, audio and additional data in storage 400 through first interface 103. This data stored in storage 400 may be read according to read signal of controller 300, to be decoded.

Second decoder 109 decodes the adaptation field of the stream, and stored necessary data in storage 400 through first interface 103. PES data for the video, audio and additional data is descrambled by descrambler 110. The descrambling algorithm employed for this is for digital video broadcasting (DVB), and it is also applied to Korea DVB. The descrambled data is stored in third buffer 112, and decoded by third decoder 113. A portion of the decoded PES header is stored in storage 400 through first interface 103. The video bit stream is output to second decoder 600 of FIG. 3, which is a video decoder, through third interface 114.

The audio data and additional data are stored in storage 400 through first interface 103, read by fourth and fifth buffers 115 and 116, and then output to third and fourth decoders 700 and 800 shown in FIG. 3C through third interface 114. Third decoder 700 is a decoder for audio data, and fourth decoder 800 is a decoder for additional data. There is no memory added to third and fourth decoders 700 and 800, and storage 400 serves as a common buffer in the demultiplexer. When data is read and written from/to storage 400 through first interface 103, third memory 104 stores start, end, road and write pointers corresponding to the data buffer of the storage. First memory 108 stores PID (program identification) and type of packer to be decoded, and decoding is carried out according to the PID and type stored in first memory 108. Second interface 117, which is a block for outputting the transport stream to first decoder 500 as shown in FIG. 3C, outputs video and audio data other than currently being decoded and displayed video and audio data, according to the user's selection. That is, the data output through second interface 117 includes broader data, and thus can be used for displaying.

Figure 5:
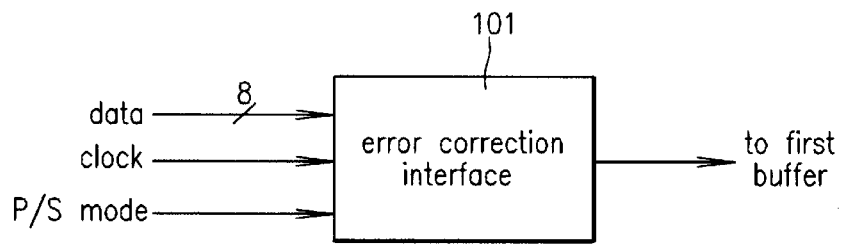
FIG. 5 is a diagram illustrating the input/output ports of error corrector of FIG. 4 in detail.
Figure 6:
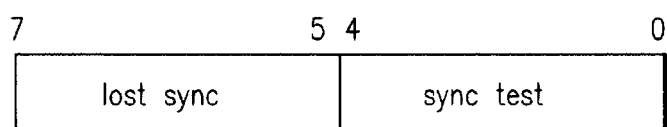
FIG. 6 is a diagram illustrating an inner data format of the sync detector of FIG. 4.
Figure 7:
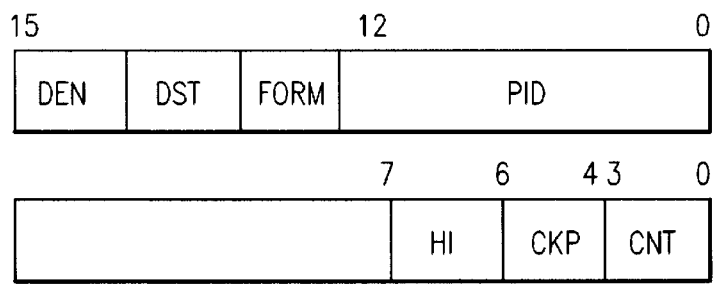
FIG. 7 is a diagram illustrating an inner data format of the first memory of FIG. 4.

FIG. 5 illustrated the input/output ports of error correction interface 101 of FIG. 4 in detail, FIG. 6 illustrate the inner data format of sync detector 106 of FIG. 4, and FIG. 7 illustrates the inner data format of first memory 108 of FIG. 4. Referring to FIG. 5, error correction interface 101 receives the input transport stream in bit serial or byte parallel. When P/S mode value is "0", error correction interface 101 receives the transport stream in byte parallel, and, when "1", receives bit serial stream with LSB of forward error correction (PEC) data.

Sync detector 100 includes a sync register. More, Transport sync byte is 0x47. There is data of 0x47 in the transport stream data. Thus, the data of 0x47 can be recognized as sync data. To prevent this, synchronization test must be performed several times as shown in FIG. 6. The sync register can record the number of synchronization tests and number of lost synchronization. Only when the synchronization corresponds to the number of synchronization tests, sync detector 106 detects the synchronization and gives the control authority to first decoder 107. First decoder 107 checks if sync data is input to every packet correctly while decoding operation. When the synchronization does not coincide, first decoder 107 checks if the synchronization does not correspond to the number of lost synchronization in the sync register, and, when asynchronization continues, transfers the control authority to sync detector 106, to request the correct detection of synchronization. The packet to be decoded is determined by the PID information and types of the packet, stored in first memory 108. FIG. 7 illustrate a register configuration showing an format of information about the packet stored in first memory 108.

As shown in FIG. 7, when DEN value is "1", a packet whose PID is identical to the PID stored in this register is decoded. When Rf value is "1", the entire packet is output to first decoder 500 through second interface 117. There are thirty-two PID registers from 0 to 31. Thus, thirty-two PIDs can be selected. Furthermore, FORM value determines the decoding type. That is, in case of video, audio and additional data, FORM value determines if it will transmit the entire PES packet or only PES payload. In case of data other than the video, audio and additional data. FORM value determines if the transport payload is PES format or PSI format. Second memory 111 of FIG. 4 can store eight pairs of common keys, and CKP of FIG. 7 sets a common key of the eight pairs of common keys, which will be used to descrambler 110. Accordingly, transport demultiplexer 100 of the invention can descramble sight PID packers in total.

Figure 8:
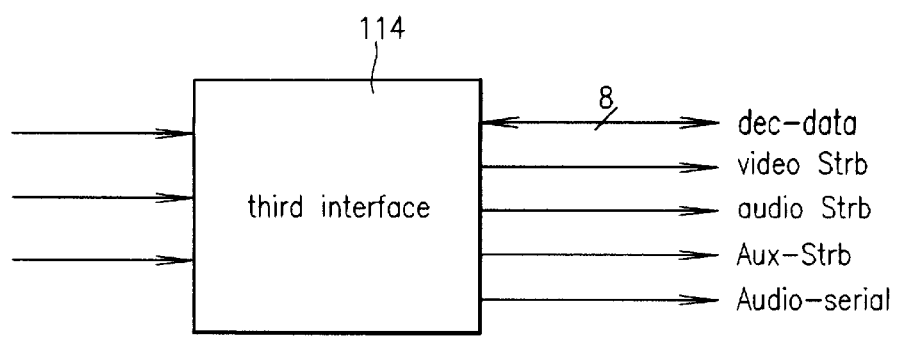
FIG. 8 is a diagram illustrating the data input/output ports of the third interface of FIG. 4.
Figure 9:
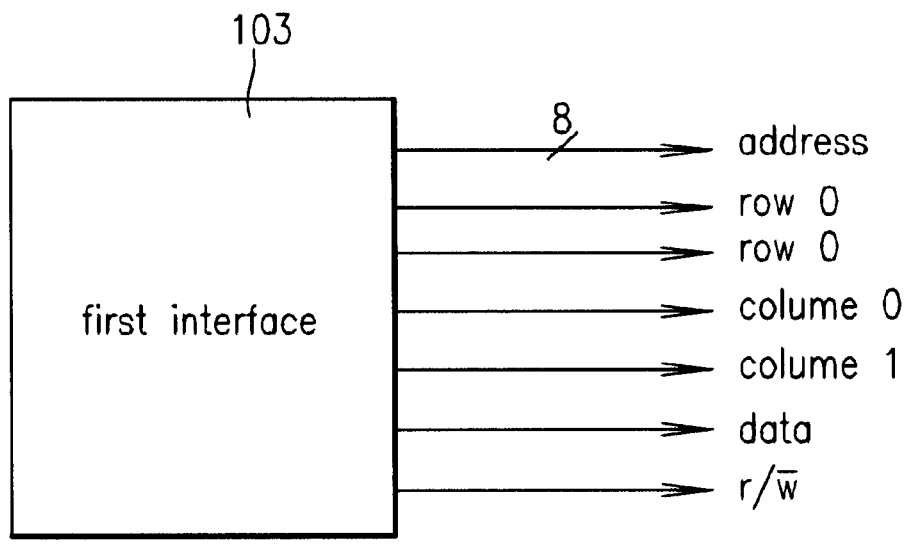
FIG. 9 is a diagram illustrating the data input/output ports of the first interface of FIG. 4.

FIG. 8 illustrates the data input/output ports of the third interface of FIG. 4, and FIG. 9 illustrates the data input/output ports of first interface of FIG. 4. As shown in FIG. 8, to decrease the number of interfaces, transport demultiplexer 150 of the invention can commonly connect 8-bit decoder data to decoders for decoding video, audio and additional data, that is, second, third and fourth decoders 600, 700 and 800 shown in FIG. 3C. Accordingly, the stream for the video data, audio data and additional data is multiplexed to the decoder data, to be output to decoders 600, 700 and 800, respectively.

The transmission of each data is carried out by vid-strb, aud-strb and aux-strb. The audio decoder, third decoder VOG, independently includes an audio-serial port for serial interface. Here, when serial mode transmission is required according to a registers setting, the data is transmitted to the corresponding audio-serial port according to aux-strb. Transport demultiplexer 100 else makes interface between controller 100 and second, third and fourth decoders 600, 700 and 800 so that they can communicate with one another. The data transmission/reception in this case is performed through decoder data port shown in FIG. 8.

Figure 10:
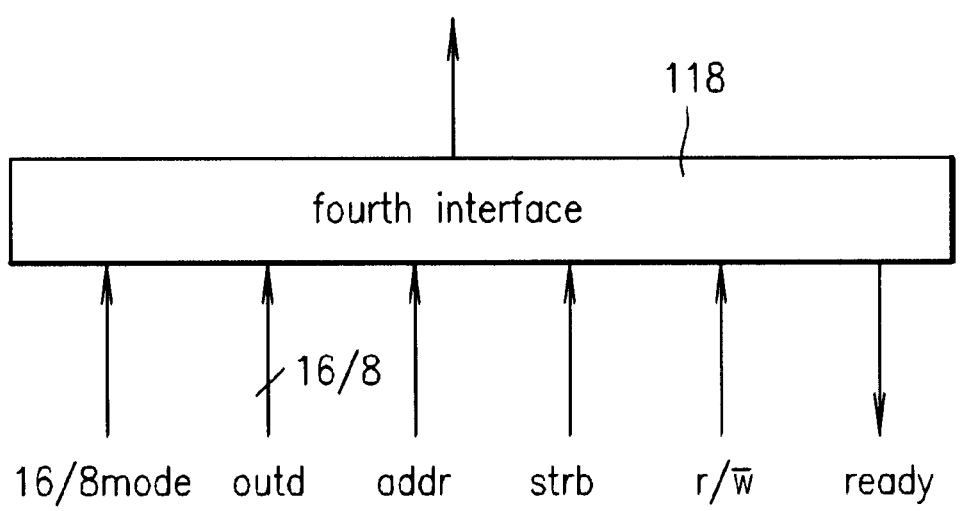
FIG. 10 is a diagram illustrating the input/output parts of the fourth interface of FIG. 4.

FIG. 9 is a block diagram showing first interface 103, which has two RASs for extension of storage 400. First interface 103 can be used as a memory of controller 300 because it can execute the read/write operations of controller 300. Accordingly, there is no need to act a separate memory to controller 300. FIG. 10 illustrates the input/output ports of fourth interface 118, which can support both 8-bit microcomputer and 16-bit microcomputer formats which are currently widely being used. Fourth interface 118 can be set in 16/8 mode.

The transport demultiplexer used in the transport decoder according to the present invention can be constructed to be hard-wired. Thus, its size to reduced compared to the conventional transport demultiplexer which operates by CPU, but the decoding speed is increased. Moreover, the transport demultiplexer of the invention can use the external storage so that the capacity of the buffer included therein can be decreased remarkably.

In will be apparent to these skilled in the art that various modifications and variations can be made in the demultiplexer and transport decoder employing the same of the present invention without departing from the spirit or scope of the invention. Thus, it is intended that the present invention cover the modifications are variations of this invention provided they come within the scope of the appended claims and their equivalents.

What is claimed is:

1. A demultiplexer, comprising:

a buffer for temporarily storing and outputting a transport, stream, the transport stream consisting of header portion and payload portion, the header portion including a transport header and PES/PSI header;

a controller for receiving the transport stress output from the buffer, and being operated according a mode signal applied thereto, to output the header portion and payload portion of the transport stream without any change;

a PES/PSI decoder for receiving the transport stream output from the buffer, and being operated according to the mode signal applied thereto, to decode only PES/PSI header and output only payload portion; and a transport header decoder for detecting the transport header from the transport stream went from the buffer, and supplying the mode signal to the controller and PES/PSI decoder according to the content of the detected header, the mode signal being one of a signal for operating only PES/PSI decoder, a signal for operating only controller, and a signal for operating both the PES/PSI decoder and controller.

2. The demultiplexer as claimed in claim 1, wherein the controller includes, a header buffer for storing the transport header of the transport stream, a payload butter for storing the payless portion of the transport stream, and a control circuit for outputting the transport header stored in the header buffer in response to the mode signal from the transport header decoder, and then outputting the payload portion stored in the payload buffer.

3. The demultiplexer as claimed in claim 2, wherein the header buffer for storing the transport header has four bytes of capacity.

4. The demultiplexer as claimed in claim 1, wherein the transport stream is constructed in 188 bytes.

5. A transport decoder, comprising:

a demultiplexer for demultiplexing an input transport stream, to output PID streams desired by a user in the form of transport stream, and outputting the transport stream other than the PID streams according to an output control signal selected by the user;

a storage for storing the transport stream output from the demultiplexer;

second, third and fourth decoders for decoding video data, audio data and additional data according to a select control signal selected by the user, respectively;

a first decoder for decoding the transport stream, to decoder the stream other than the currently being decoded video data stream, audio data stream and additional data stream according to a selection of the user, and to transmit it; and control means for providing the output control signal.

6. The transport decoder an claimed in claim 5, the storage is configured of DRAM, to be used as a buffer for video data and audio data.

7. The transport decoder as claimed in claim 5, wherein the demultiplexer is constructed in hard-wired.

8. The transport decoder as claimed in claim 5, wherein memories added to the second, third and fourth decoders are combined into one by the storage.

9. The transport decoder as claimed in claim 5, wherein the demultiplexer comprises:

a buffer for temporarily storing and outputting a transport stream, the transport stream consisting of header portion and payload portion, the header portion including a transport header and PES/PSI header;

a controller for receiving the transport stream output from the buffer, and being operated according a mode signal applied thereto, to output the header portion and payload portion of the transport stream without any change;

a PES/PSI decoder for receiving the transport stream output from the buffer, and being operated according to the mode signal applied thereto, to decode only PES/PSI header and output only payload portion; and a transport header decoder for detecting the transport header from the transport stream sent from the buffer, and supplying the mode signal to the controller and PES/PSI decoder according to the content of the detected header, the mode signal being one of a signal for operating only PES/PSI decoder, a signal for operating only controller, and a signal for operating both the PES/PSI decoder and controller.

10. The transport decoder as claimed in claim 9, wherein the controller includes; a header buffer for storing the transport header of the transport stream; a payload buffer for storing the payload portion of the transport stream; and a control circuit for outputting the transport header stored in the header buffer in response to the mode signal from the transport header decoder, and then outputting the payload portion stored in the payload buffer.

11. The transport decoder as claimed in claim 10, wherein the header buffer for storing the transport header has four bytes of capacity.

12. The transport decoder as claimed in claim 9, wherein the transport stream is constructed in 188 bytes.

13. The transport decoder as claimed in claim 5, wherein the demultiplexer includes:

a first interface for buffering the input transport stream, and interfacing the bufferred transport stream, to store it in the storage;

a sync detector for detecting synchronization for the transport stream stored in the storage;

a first memory for storing of data and decoding type of a packet to be decoded in the transport stream;

a first decoder for decoding the transport header of the transport stream according to the detected synchronization, P1 data and decoding type of the packet stored in the first memory, to detect a desired packet;

a descrambler for descrambling the video data, audio data, additional data and PES data output from the second buffer;

a third decoder for decoding the descrambled data;

a second interface for transmitting a desired portion of the transport stream without any change; and a third interface for interfacing the video data, audio data and additional data decoded by the third decoder.

14. The transport decoder as claimed in claim 13, wherein the first interface includes two RASs for the extension of the storage.

15. The transport decoder sa claimed in claim 13, wherein the first interface can read and write the transport stream from/to the storage, and can be used as a memory.

16. The transport decoder as claimed in claim 13, wherein the second interface commonly connects 8-bit decoding data to decoders video data, audio data and additional data.

17. The transport decoder as claimed in claim 13, wherein the second interface additionally includes an audio serial port for serial interface to a decoder for audio data.

18. The transport decoder as claimed in claim 13, further comprising an error correction interface which includes parallel/serial mode port for receiving the transport stream in bit serial or byte parallel.

19. The transport decoder as claimed in claim 13, wherein the transport stream is received in byte parallel when the parallel/serial mode signal value is "0", and in bit serial when it is "1".

* * * * *